(12) United States Patent
Yachi (10) Patent No.: US 8,634,694 B2
(45) Date of Patent: Jan. 21, 2014

(54) VIDEO REPLAY SYSTEM AND A CONTROL METHOD THEREOF

(75) Inventor: Masahiro Yachi, Tama (JP)

(73) Assignee: Benesse Corporation, Okayama-Shi, Okayama (JP)

( * ) Notice: Subject to any disclaimer, the term of this patent is extended or adjusted under 35 U.S.C. 154(b) by 466 days.

(21) Appl. No.: 12/342,898

(22) Filed: Dec. 23, 2008

(65) Prior Publication Data

US 2010/0046911 A1 Feb. 25, 2010

(30) Foreign Application Priority Data

Dec. 28, 2007 (JP) ................................. 2007-339466

(51) Int. Cl.
*H04N 5/932* (2006.01)

(52) U.S. Cl.
USPC ........... 386/201; 386/230; 386/203; 386/205; 386/206; 386/222

(58) Field of Classification Search
USPC .......... 386/231, 201, 230, 203, 205–206, 222
See application file for complete search history.

(56) References Cited

U.S. PATENT DOCUMENTS

| | | | | |
|---|---|---|---|---|
| 5,564,005 A * | 10/1996 | Weber et al. | .................. | 715/863 |
| 5,793,948 A * | 8/1998 | Asahi et al. | .................. | 714/47.1 |
| 6,172,712 B1 * | 1/2001 | Beard | ........................... | 348/552 |
| 6,993,246 B1 * | 1/2006 | Pan et al. | ...................... | 386/201 |
| 8,504,369 B1 * | 8/2013 | Chigier et al. | ................ | 704/270 |
| 8,504,674 B2 * | 8/2013 | Vaught | ........................... | 709/223 |
| 2002/0197593 A1 * | 12/2002 | Sutton | .......................... | 434/276 |
| 2004/0002049 A1 * | 1/2004 | Beavers et al. | .............. | 434/350 |
| 2004/0128691 A1 * | 7/2004 | Egawa et al. | .................. | 725/88 |
| 2004/0152054 A1 * | 8/2004 | Gleissner et al. | ............. | 434/156 |
| 2006/0039676 A1 * | 2/2006 | Van Der Heijden et al. | ... | 386/68 |
| 2007/0006266 A1 * | 1/2007 | Yamamoto | ...................... | 725/46 |
| 2007/0087781 A1 * | 4/2007 | Bettis et al. | ................. | 455/556.1 |
| 2010/0205366 A1 * | 8/2010 | Piepho | .......................... | 711/111 |

FOREIGN PATENT DOCUMENTS

JP 2008096482 A 4/2008

OTHER PUBLICATIONS

Francis C. Li et al.; "Browsing Digital Video"; Conference on Human Factors in Computing Systems; Proceedings of the SIGCHI conference on Human factors in computing systems; *CHI Letters*, vol. 2, Issue 1; pp. 169-176; Apr. 1-6, 2000.

Ryota Nakamura et al.; ""Ghost-Tutor" : A Learning Support System Suggesting Learning Pace for on-Demand Learning"; *Transactions of Information Processing Society of Japan*, vol. 47, No. 7; pp. 2099-2106; Jul. 2006.

(Continued)

*Primary Examiner* — Helen Shibru
(74) *Attorney, Agent, or Firm* — Fish & Richardson P.C.

(57) ABSTRACT

A purpose of the present invention is to provide a video replay system and a control method thereof in which the video replay speed is automatically controlled based on the note-taking speed of each viewer. The video replay system of the present invention comprises storage means for storing the video data; video replay means for replaying a video by reading the stored video data out of the storage means and displaying the video data on the display; detection means for monitoring a predetermined viewing behavior of a viewer of the replayed video, and for detecting a parameter associated with the viewing behavior; and automatic controlling means for, in response to the parameter detected by the detection means, automatically controlling the speed at which the video is replayed by the video replay means.

20 Claims, 5 Drawing Sheets

(56) References Cited

OTHER PUBLICATIONS

Nigel Ward et al.; "Software for Taking Notes in Class"; *Keio University Session S2E—33$^{rd}$ ASEE/IEEE Frontiers in Education Conference*; 7 pages; Nov. 5-8, 2003.

Masahiro Yachi et al.; "An Active Viewing System to Utilize Streaming Video for Education"; *Proceedings of the 2007 International Symposium on Applications and the Internet Workshops (SAINTW'07)*; 4 pages; 2007.

David Bargeron et al.; "Annotations for Streaming Video on the Web"; *Late-Breaking Results—CHI 99*; pp. 278-279; May 15-20, 1999.

Masahito Yachi et al.; "Application of Image Editing System for English e-Learning material"; 2 pages.

* cited by examiner

VIDEO REPLAY SYSTEM AND A CONTROL METHOD THEREOF

BACKGROUND OF THE INVENTION

The present invention relates to a video replay system and a control method thereof. More particularly, the present invention relates to a video replay system and a control method of such a system whose video replay speed is automatically controlled in response to a viewing behavior (or manner) of a viewer. Examples of the viewing behavior of the viewer on the basis of which the replay speed is controlled include the speed of taking notes by using input means such as a keyboard or a touch panel and the viewer's concentration level that can be estimated based on the loci of his/her sight line.

Currently, video distribution via the Internet is widely practiced. It has already become common to watch video news and movies via the Internet. Besides watching such video news and movies, a large number of people try to learn various subjects through audio and video lectures distributed via the Internet. In this patent application, the inventors would like to propose, by referring to video lectures distributed via the Internet, how such lectures can be utilized in the area of education. Non-interactive learning methods using electronic materials such as video lectures are often referred to as e-learning. As a person skilled in the art will readily understand, electronic materials used in e-learning are not limited to materials distributed via a communication network including the Internet (a LAN or a WAN included), but include materials stored on storage media such as a CD-ROM or a DVD, materials downloaded to a client computer, video lectures broadcasted as a television program, and so on. Of course, it does not matter in the present invention which communication network is employed.

Online distribution of video lectures has become popular as a method of delivering educational materials, mainly because such a method makes it possible to remotely attend lectures given by skilled teachers, regardless of temporal and geometrical limitations. At the same time, its efficient and economical nature may be why online distribution of video lectures has become so popular. In higher educational institutions such as universities and colleges, the practice has already been adopted to record ordinary lectures and to make them freely available to members of the general public who wish to remotely attend the lectures. An example of such on-line distribution of university and college lectures is Open Course Ware, which started at the Massachusetts Institute of Technology and has gradually spread to other universities including those in Japan. Accredited undergraduate and graduate degrees can now be obtained through e-learning. For example, Shinshu University and Cyber University are examples of such universities that grant accredited undergraduate and graduate degrees through e-learning. In addition, as various educational contents are being provided as vocational and professional training courses within enterprises or as preparatory courses designed for qualification examinations, the scope of e-learning is still widening.

In the case of e-learning at university or adult level, viewers of or listeners to lectures are usually interested in and actually need to learn the content of the lectures, and thus tend to actively pay attention to them. On the other hand, however, at elementary and intermediate level up to high school, the situation is different. As will be widely understood based on personal experience, a mere presentation of video lectures does not seem to function as an effective way to educate younger people, and they seem to find it difficult to maintain concentration on the video lectures.

In the prior art e-learning system, it has already been confirmed that how educational materials are delivered to learners does not result in a significant difference in educational effect when the delivered educational materials relate to advanced contents that the learners need to learn, and are thus naturally interested in. In other words, the more the delivered content is needed, the less the method of delivery of the contents are matters. However, in elementary and intermediate education up to high school, a straightforward delivery of a video lecture to students simply makes them passive and bored. To help students actively learn from the video lectures, it is necessary to provide them with a trigger by which they will become interested in the contents.

Accordingly, when video lectures are utilized as educational materials in elementary and intermediate education up to high school, it seems appropriate to prompt and encourage the learners to take notes during the lectures as such a trigger, so that they will continue to both concentrate on and be interested in the lectures. This is the basic idea underlying the video replay system of the present invention.

When video lectures are distributed via the Internet, it is possible to make the lectures interactive, which is not possible in cases of lectures on video tapes or DVDs. In remote lectures, it is sometimes said that there are three types of interaction, that is, interaction among learners, interaction between the teacher and a learner, and interaction between the delivered content and a learner. Comparative studies have been conducted on what differences in the learning drive, concentration, and effects result from adding these interactions to the video lectures to be delivered.

As a study concentrated on the interaction between on-line learners, an exemplary environment is employed wherein it is possible for learners to write comments on each scene such that the comments can be seen by any learner viewing the same on-line lectures on a certain website. However, it has not become clear which of the interaction between a learner and the teacher and the interaction between learners is more influential on educational effects. On the other hand, in a study concentrated on the interaction between the delivered content and a learner, it is reported that non-interactive video lectures and non-visual audio lectures do not result in any differences in educational effects, although interactive video lectures and non-visual audio lectures do result in differences in both educational effects and learning motivation. According to this report, when lectures are distributed on-line, providing video lectures instead of audio lectures does not change the effects of the educational materials. However, this report suggests that it may be possible to achieve some educational effects if such interaction is added so that input is required to move from one page to another page.

As mentioned above, the video replay system of the present invention aims at achieving educational effects by comprising a function that allows viewers to take notes along with viewing the video lectures. That is, in the present invention, among the three interactions above, the inventors regard the interaction between the educational materials and each student as being important, and try to encourage the student to utilize the notes when s/he reviews the lectures. More particularly, in the present invention, the inventors consider that the note-taking process by each student, which was not regarded as being so important in the prior art e-learning systems, is important, and aim at promoting interaction between the educational materials and each student by encouraging the student to take notes, so that significant educational effects will be achieved.

In elementary and intermediate education, significant effects of each student's note-taking process during classes on his/her learning process have been widely recognized. However, the prior art video materials were delivered to each student only in one direction, without the student's circumstances being taken into account. In addition, most of the prior art video materials contained more information than ordinary lectures given in a course by a single teacher. As a result of a one way delivery of a large amount of information, each student tends to be deprived of his/her imaginative and creative motives and become passive, and often ends up not taking notes on the lectures at all on the contrary, the inventors of the present invention aim to present a video replay system in which each student of the e-learning system is encouraged and is thus able to take notes on the lectures so as to interact with the delivered materials, so that significant educational effects will be achieved.

There is a paper (N. Ward et al., "Software for Taking Notes in Class", 33 ASEE/IEEE Frontiers in Educational Conference, S2E-2-8, 2003), wherein the authors point out that the note-taking process functions to help each student re-organize what is taught in the lectures, and propose a system that makes it possible for each student to take notes by inputting and hand writing letters and characters on a computer. It has been also pointed out that reviewing the lectures through notes taken by the student himself/herself will bring about more significant educational effects than doing so through notes taken by somebody else.

The present invention is based on the foregoing empirical evidence that there is a positively correlative relationship between note-taking by the student him/herself and educational effects. Thus, in the video replay system of the present invention, each viewer of the video lectures is encouraged to take notes when s/he views the lectures, and there is provided a tool that facilitates easier note-taking. More particularly, in the video replay system, the replay speed of the video lectures is automatically controlled to be responsive to the viewer's speed of taking notes, so that the viewer will have enough time to take notes as the lectures proceed. In other words, if the viewer takes notes slowly, then the video lectures are replayed slowly. If the viewer takes notes fast, then the video lectures are replayed accordingly. That is, if the volume of notes taken in relation to a certain scene is large, the video lectures are replayed at a slower speed. If the amount of notes taken in relation to a certain scene is small, the video lectures are replayed at a faster speed. Through the note-taking process along with the viewing of the video lectures, an interaction arises from between the student and the educational materials. As a result, (1) the student will more actively be engaged with the video materials, and (2) the student will be able to use the notes s/he has taken when reviewing the lecture.

SUMMARY OF THE INVENTION

In accordance with the present invention, a video replay system for replaying video data on a computer that has output means including a display and input means including a keyboard or a touch panel is provided, wherein the system comprises: storage means for storing the video data; video replay means for replaying a video by reading the stored video data out of the storage means and displaying the video data on the display; detection means for monitoring a predetermined viewing behavior of a person who is viewing the replayed video, and for detecting a parameter associated with the viewing behavior; and automatic controlling means for, in response to the parameter detected by the detection means, automatically controlling the speed at which the video is replayed by the video replay means.

In an embodiment of the video replay system in accordance with the present invention, the parameter may be the speed at which the viewer takes notes by using the input means.

Further, in accordance with the present invention, a method for controlling a video replay system for replaying video data on a computer that has output means including a display and input means including a keyboard or a touch panel is provided, wherein the method comprises the steps of: replaying a video by reading video data stored in storage means and displaying the video data on the display; monitoring a predetermined viewing behavior of a person who is viewing the replayed video, and detecting a parameter associated with the viewing behavior; and in response to the detected parameter, automatically controlling the speed at which the video is replayed by the video replay means.

In an embodiment of the method in accordance with the present invention, the parameter may be the speed at which the viewer takes notes by using the input means.

In addition, the present invention may be embodied as a computer readable storage medium on which a computer program that causes a computer to execute the steps included in the above-mentioned method is stored.

In addition, the present invention may be embodied as a computer program that causes a computer to execute the steps included in the above-mentioned method.

DETAILED DESCRIPTION OF THE PREFERRED EMBODIMENTS

In the following description, how the video replay system in accordance with the invention operates will be explained by referring to the drawings. As already described above, it can be readily appreciated by ordinary users of a computer that video data may be replayed in various manners. That is, video data downloaded via a communication line such as the Internet may be replayed. Video data stored on such storage media as a CD-ROM, a DVD, or a hard disk drive may also be replayed.

To distinguish the video replay system of the present invention from the prior art systems wherein video lectures are provided to viewers in only one direction, such an interface is provided that allows each viewer to take notes while viewing the video lectures, so that the viewer will be able to actively learn through interaction between the viewer and the educational materials.

Furthermore, as an auxiliary function, the video replay system of the present invention can be configured to have a function to attach a bookmark of a still image extracted from the video lectures to facilitate the essence of the scene to be grasped. This bookmark, however, is a function belonging to the prior art. Please refer to Yachi.

Masahiro et al. "Implementation of Extraction of Still Images out of Video Lectures in E-Learning of English," Japanese Society for Educational Technology. Lectures and Papers for the 21st Convention, pp. 609-610, 2005.

It is clear that the video replay speed of video lectures, especially the replay speed of the sound accompanying the video, has significant effects on how easily the lectures can be followed. Therefore, it is convenient if the replay system has a function for each of the viewers to manually select a desired replay speed. When replaying a voice file, the technology of manually setting replay speed of the file to a suitable speed without changing the voice pitches is a conventional well-known technology. As has already been accomplished by commercially available recording devices, it is possible to only vary the replay speed in the range of about 0-7 to 1.2 times so as to produce a comfortable sound without changing a pitch. Then, the inventors of the present invention invented a function that detects the speed at which a student takes notes while viewing the replayed video lectures as an additional function to a former type video replay system, wherein it is possible to automatically control the video replay speed according to the detected notes taking speed. Then, even if it is not set manually, the video replay speed will be automatically set by the video replay speed automatic control function of the video replay system of this invention to a level according to the viewer's note-taking speed, which adds significant convenience.

In the video replay system of the present invention, it is possible to add to the system convenient functions already known in the prior art video replay system. First, a still image clip is prepared for a few seconds of the video lectures, and it is possible to randomly access the scene corresponding to the image when the image is clicked on. This is similar to the menu function realized in DVDs. This function makes it possible to jump to a scene in an instant at a specific time during a video lecture. Moreover, secondly, long silent periods are extracted from the video lectures, about 10 to 20 second-long paragraphs sandwiched by the silent periods and portions of the sentences sandwiched by shorter silent periods realized by commas and periods are stored in the system, it will be possible to return to a most recent silent portion by clicking the return key, for example, when notes are to be taken. As a result of this function, the notes can be taken more easily, and the still image and text box are extracted from the video lectures. It is possible to re-edit the notes taken by clicking on a comment, and a still image corresponding to a comment can be moved to the scene by a click.

The video replay system in accordance with the present invention is basically designed for self-study, and for use at home. Therefore, this video replay system can be operated on an ordinary personal computer connected to the Internet via a common means by which video lectures are replayed without installing special software. It has been confirmed that the video replay system may operate with Internet Explorer 6 of Windows XP and with Windows Media Player 10. If the replayed video lectures are the streaming files in which index information stored in Windows Media format, the lectures can be used by placing the files on a streaming server or a client computer. However, since random access is made to the video during the replay, http streaming cannot be used.

The still image clips and interfaces operate on a Linux server as a web application. To generate still image clips of a scene that one wishes to extract, the FFMPEG that can be obtained from <http://ffmpeg-mplayerhq.hu/> will be used. For storing study history, the SQLite that can be obtained from <http://www.sqlite.org/> can be used, for example. The PHP can be used for functional cooperation at a server side.

The interface that a student uses on a display can be implemented by use of JavaScript®. In the present invention, while maintaining operability similar to that available when using a keyboard, it is possible to limit inputs to those from a keyboard so as to provide the video lectures with interactivity, and it is also possible to allow other input methods including inputting hand-written letters/characters by using a pen tablet.

In addition, a special pen (Anoto pen), which is commercially available from Anoto Group AB of Sweden, can also be used as an example of the input means in the video replay system in accordance with the present invention. An Anoto pen is a pen equipped with a CCD camera at its nib. If an Anoto pen is used to write letters/characters or figures on a dedicated paper on which special patterns are pre-printed, the CCD camera reads the patterns the nib has followed on the paper, and the pen is configured to wirelessly transmit to a server what letters/characters or figures have been written as digital data. Therefore, if letters/characters and figures are written to the dedicated paper with an Anoto pen, the notes taken will be transmitted to a computer by means of wireless communication. If the length of each stroke of the pen and the time when the check boxes are checked are acquired from the transmitted data, the same information as that from a keyboard or a touch panel can be received. One can start to write letters/characters or figures by checking a check box on the dedicated paper. In any event, if it is possible to detect each viewer's input speed with any one of a keyboard, a touch panel in which an input is made by contact of a pen etc, or an Anoto pen, such a device can be used as an input means in the video replay system in accordance with the present invention. The core feature of the present invention is that the video replay speed is automatically controlled according to the speed at which each viewer takes notes. Therefore, it does not matter what input means is used. Of course, this is because a keyboard, a touch panel, and an Anoto pen all belong to the prior art.

Figure 1:
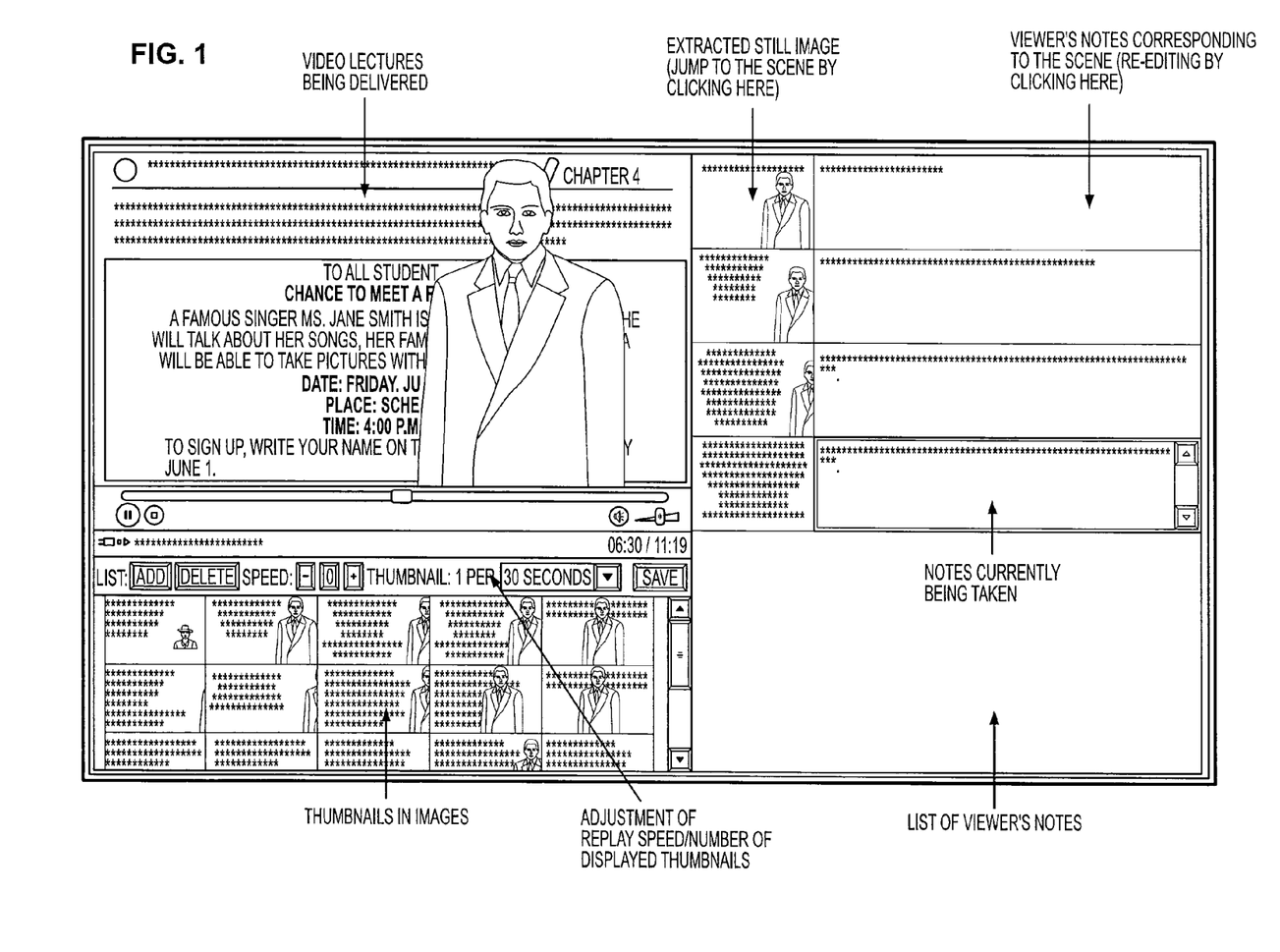
FIG. 1 is an exemplary interface with which notes are taken in the video replay system of the present invention.

FIG. 1 shows what is on a display while the video replay system of the present invention operates. Video lectures are replayed on the left-hand side of the display while an interface for each viewer to take notes is shown on the right-hand side of the display.

As mentioned above, the video replay system in accordance with the present invention comprises two interfaces. The first interface makes it possible for each viewer to take notes while video lectures are being replayed. The second interface is for subsequently reviewing the notes taken after the video lectures are completed. The first interface is an interface for writing in and saving a comment in each scene in parallel to the video replay as work equivalent to a process in which notes are taken during viewing of the replayed video lectures. The second interface is an interface for recording a study history as a portfolio and reviewing the notes taken just as students would afterward review ordinary paper notes taken during a class. FIG. 1 shows the first interface used for taking notes during viewing of the replayed video lectures.

Next, by referring to FIG. 1, an exemplary embodiment of the keyboard operation performed by a student is described. When the return key is pressed during viewing of the replayed video lectures, a text box in which notes will be taken will be displayed along with a still image of the lecture at the moment the return key is pressed on the right-hand side of a video replay screen. Video lectures continue to be replayed in the meantime. When letters/characters corresponding to the lecture image are inputted as lecture notes, the return key or the tab key will be pressed, so that a subsequent still picture and a text box will be displayed. Please note, as stated previously, that the video replay system of the present invention comprises a function to automatically detect the speed of each student's keystroke and to set the video replay speed in accordance with the detected speed. More specifically, periods of silence are extracted out of the replayed video lectures, the number of the key pressed by the student during a paragraph of a length of about 10 to 20 seconds sandwiched between long silent periods is calculated, and the video replay speed is automatically set in accordance with one of a plurality predetermined references. How much the detected number is greater or smaller than the average key presses during a paragraph increases or decreases the video replay speed. More particularly, the speed of the lecturer's speech speed is determined accordingly. When replay of the lectures is too fast and note-taking cannot follow, the replay stops at a most recent long silent portion, and the replay re-starts after detection is made that the continuous keystrokes have finished. Conversely, when no inputs are made during a paragraph, replay speed is automatically increased until a scene at which the student thinks it necessary to start to take notes and actually starts to do so. When one of the extracted still images is clicked on, the viewer is brought back to the scene of the clicked still image. By adjustment of the speed by the control bar of the center of right-hand side, or by a keyboard operation, the lecture will be replayed again.

By repeating the above steps, a list that corresponds to the viewer's notes and the scenes where the notes have been taken can be made as the viewer writes sentences with a keyboard. The notes taken with the video replay system in accordance with the present invention can be printed out and used as a review notebook, and also can be added as subtitles on the video lectures to be replayed. Moreover, the notes can be used as metadata, so that specific letters/characters, terms, and expressions in the notes can be searched to find relevant images included in the lectures.

If they use the above-explained video replay system of the present invention, both each student and the lecturer are able to obtain a feedback that was not obtained in the prior art video lecture systems. As to each student, video replay in accordance with each student's pace is made possible by the video replay speed adjustment function of the video replay system of the present invention, and also by the function which makes it possible to arbitrarily specify a particular scene that the viewer considers important. Of course, the notes taken from the replayed video lectures serve as data for reviewing what was learned along with better understanding of the contents of lectures. When notes are taken while slides are shown, the viewer will be able to have materials for review.

Because the video replay speed is automatically adjusted according to each student's individual pace, the lecturer can deliver the lectures at his/her own pace without worrying too much about the replayed lectures. Moreover, by corresponding the content of lectures with the notes taken by each student, the present invention is beneficial in that it will become possible to confirm how the lectures have been received, to evaluate how well each lecturer delivers lectures, to investigate the most significant differences between a more capable student and a less capable student. Furthermore, during lectures, because each viewer is encouraged to take notes before proceeding to a following scene, it is possible for the lecturer to point out to the viewer in advance when a lecture is temporarily stopped, so that the lectures will better be suited to each viewer's pace just as in an ordinary face-to-face lecture.

Next, a hardware configuration of the video replay system in accordance with the present invention will be explained briefly. The replay speed automatic control of the video replay system of the present invention is realized by the software that comprises instruction sets that cause a computer to execute the steps corresponding to the processes above.

What follows describes specifically how the hardware resources are related to the information processing by the software, and how the software cooperates with the hardware resources to achieve the desired ends of the present invention.

Figure 2:
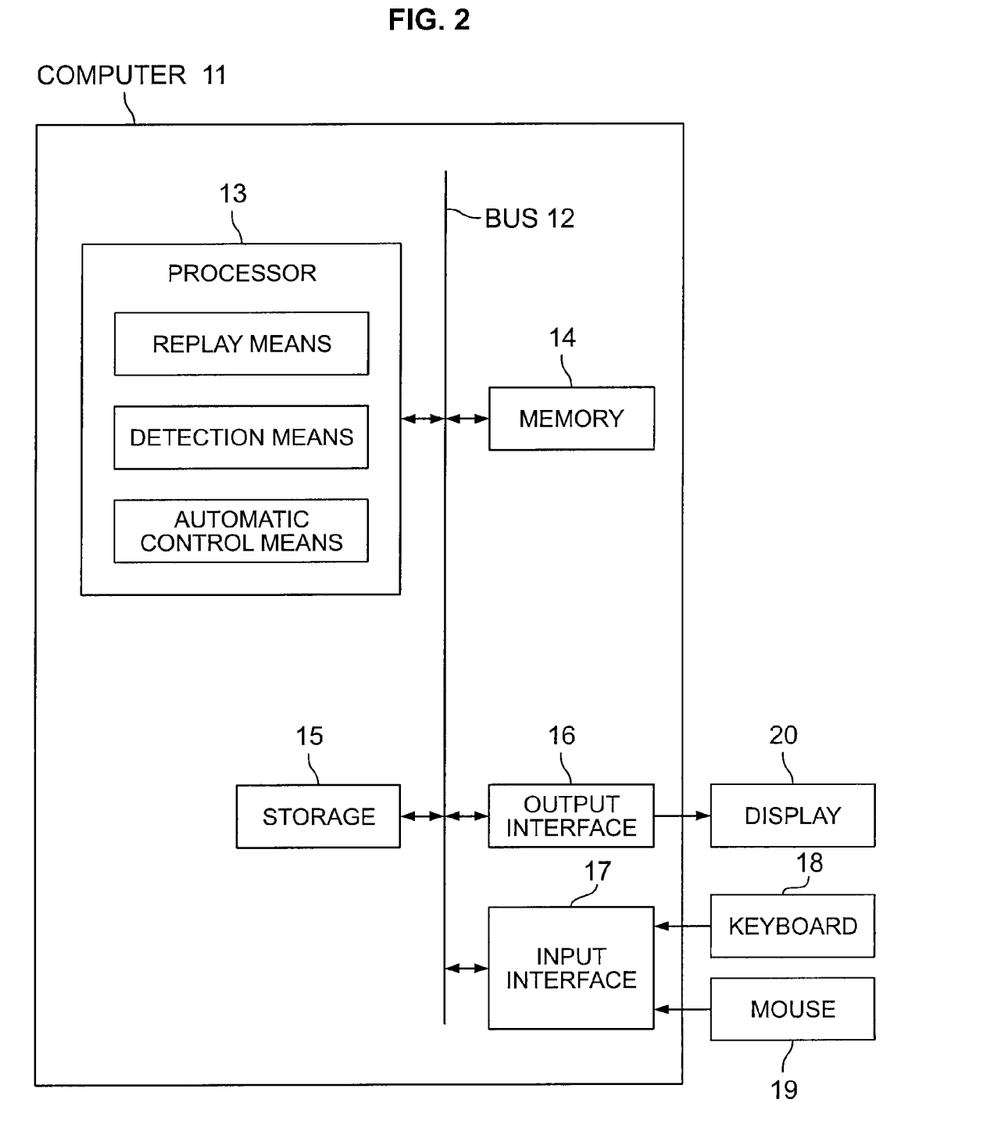
FIG. 2 is a block diagram illustrating a hardware configuration of the video replay system of the present invention.

FIG. 2 is a block diagram illustrating a typical computer hardware configuration in which the software that automatically controls the video replay speed in accordance with the present invention operates. In this figure, the outline of computer 11 that is operated by the software that performs the automatic control of the video replay speed in accordance with the present invention is shown. Computer 11 comprises processor 13, memory 14, storage 15, output interface 16, and input interface 17, all of which are mutually connected by bus 12. Display 20 is connected to output interface 16 while keyboard 18 and mouse 19 are connected to input interface 17.

The computer program that consists of an instruction set that causes each means included in the video replay system in accordance with the present invention to perform a predetermined operation is stored in storage 15. When the video replay system in accordance with the present invention performs information processing, predetermined instructions are transmitted to memory 14 via bus 12. The instructions read out to memory 14 are interpreted and executed by processor 13.

The video replay means for replaying a video by reading the stored video data out of storage means and displaying the video data on the display; detection means for monitoring a predetermined viewing behavior of a person who is viewing the replayed video, and for detecting a parameter associated with the viewing behavior; and automatic controlling means for, in response to the parameter detected by the detection means, automatically controlling the speed at which the video is replayed by the video replay means included in the video replay system in accordance with the present invention, are realized as such functions that processor 13 interprets and executes instructions loaded onto memory 14. Memory 14 holds the instructions to be executed by processor 13 along with the result. Processor 13 fetches instructions from memory 14 and executes these instructions, which perform information processing in each of the stages that constitute the video replay in accordance with the present invention. In the case of a personal computer or a workstation, processor 13 is a microprocessor, and may also be a dedicated ASIC for a specific use. Inputs to computer 11 are made through such input devices as keyboard 18 or mouse 19 and input interface 17, and outputs from computer 11 are made through an output device, that is, display 20 and output interface 16.

In addition, although computer 11 is illustrated as an independent standalone computer in FIG. 2, it is also possible to constitute it as a client computer connected in a communication network. When a computer is thus configured, the video data stored in the storage is not read out and replayed, but a streaming replay can be carried out without once storing the video data downloaded via the communication network. Because it should readily be appreciated by those skilled in the art, the details of modifications that will be necessary in such cases will not be explained here.

The video replay system of the present invention comprises the above-mentioned replay means, detection means, and automatic control means. These means perform each of the data processing that constitutes the present invention. In the block diagram shown in FIG. 2, each data processing will be realized by the software comprising instruction sets that are stored in storage 15, are read out to memory 14, are interpreted by processor 13, and have computer 11 perform the predetermined processing.

As will readily be appreciated by those skilled in the art, each data processing performed by each of the above-mentioned means is performed on computer 11 by the computer program which consists of the corresponding instructions. These means, as indicated in the box of processor 13 of FIG. 2, may exist in a form embedded into the computer hardware that executes such a computer program, or may be stored on various computer readable media. Computer readable media have coded forms that can be decoded when they are actually used in a specific information processing system. Computer software or program as used in this patent application means an expression in an arbitrary programming language of instruction sets that causes certain computer hardware capable of processing information to perform a specific function.

What is illustrated in FIG. 2 is merely an example, and the present invention is not limited to the specific architecture of FIG. 2. Hardware configuration in which the video replay system of the present invention is realized varies in accordance with how it is implemented. Thus, the video replay system and control method thereof in accordance with the present invention are realized as a combination of hardware and software. A typical combination of hardware and software is a computer system in which a computer program is installed that causes the computer system to perform the means and steps which, when it is loaded to a memory and a processor interprets it, realizes the present invention.

Figure 3:
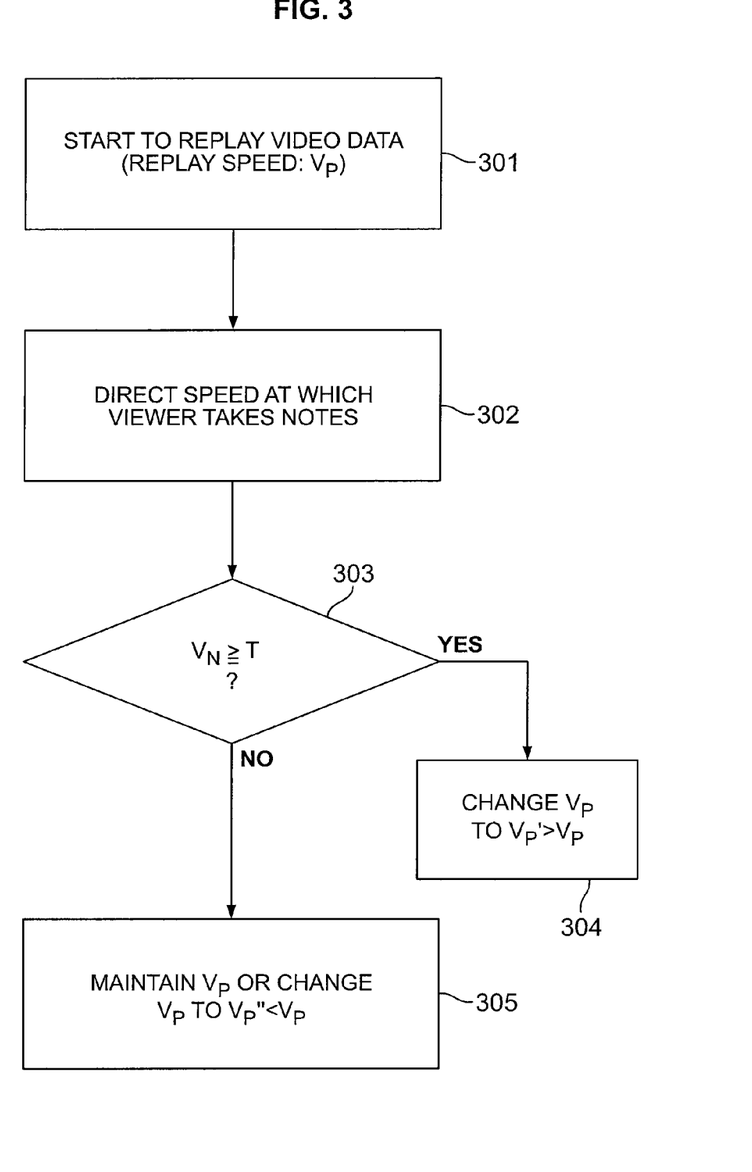
FIG. 3 is a flowchart illustrating how the video replay system of the present invention operates.

In addition, a flow chart showing an outline of operations of the video replay system in accordance with the present invention is shown in FIG. 3. Video replay is started at Step 301. Video replay speed is represented by Vp. At Step 302, the system detects the speed at which the viewer takes notes by using a keyboard. This note-taking speed is represented by Vn. At Step 303, the detected note-taking speed is compared to a predetermined reference speed that is, it is determined whether the predetermined reference speed T is smaller than Vn, that is, whether the inequality Vn≥T holds. When the detected note-taking speed is greater than the predetermined reference speed, that is, when Vn≥T, the video replay speed Vp is increased to Vp' at Step 304, wherein Vp'>Vp. When the detected note-taking speed is smaller than the predetermined reference speed, that is, when Vn<T, Vp is maintained, or video replay speed Vp is decreased to Vp" at Step 305, wherein Vp<Vp".

In FIG. 3, when the note-taking speed Vn is greater than the predetermined threshold T, Vp is changed to Vp' at Step 304. When the note-taking speed Vn is smaller than the predetermined threshold T, Vp is maintained at Step 305, or it is changed to Vp", which is smaller than Vp. However, this is only an embodiment of the present invention, and the system can be controlled in a different behavior. For example, it is also possible to maintain Vp at Step 304, or to change Vp to Vp' so as to further change Vp' to Vp" at Step 305, wherein Vp" is slower than Vp. The core Idea of the present invention is the function of automatically adjusting the video replay speed on the basis of the speed of the viewer's note-taking speed at each of the specific scenes in the video lectures.

Figure 4:
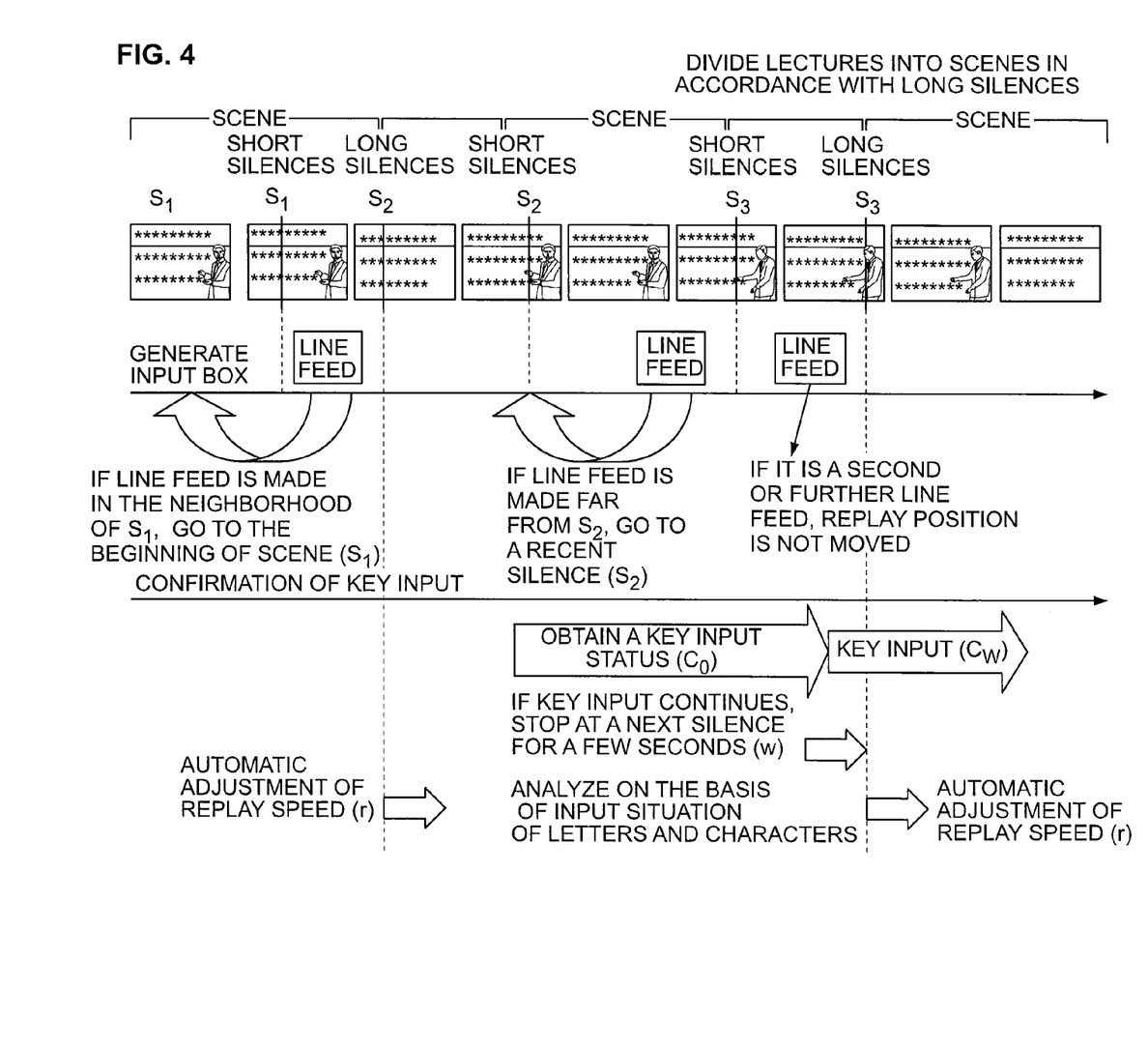
FIG. 4 shows details of the automatic adjustment of the video replay speed in the video replay system of the present invention operates.
Figure 5:
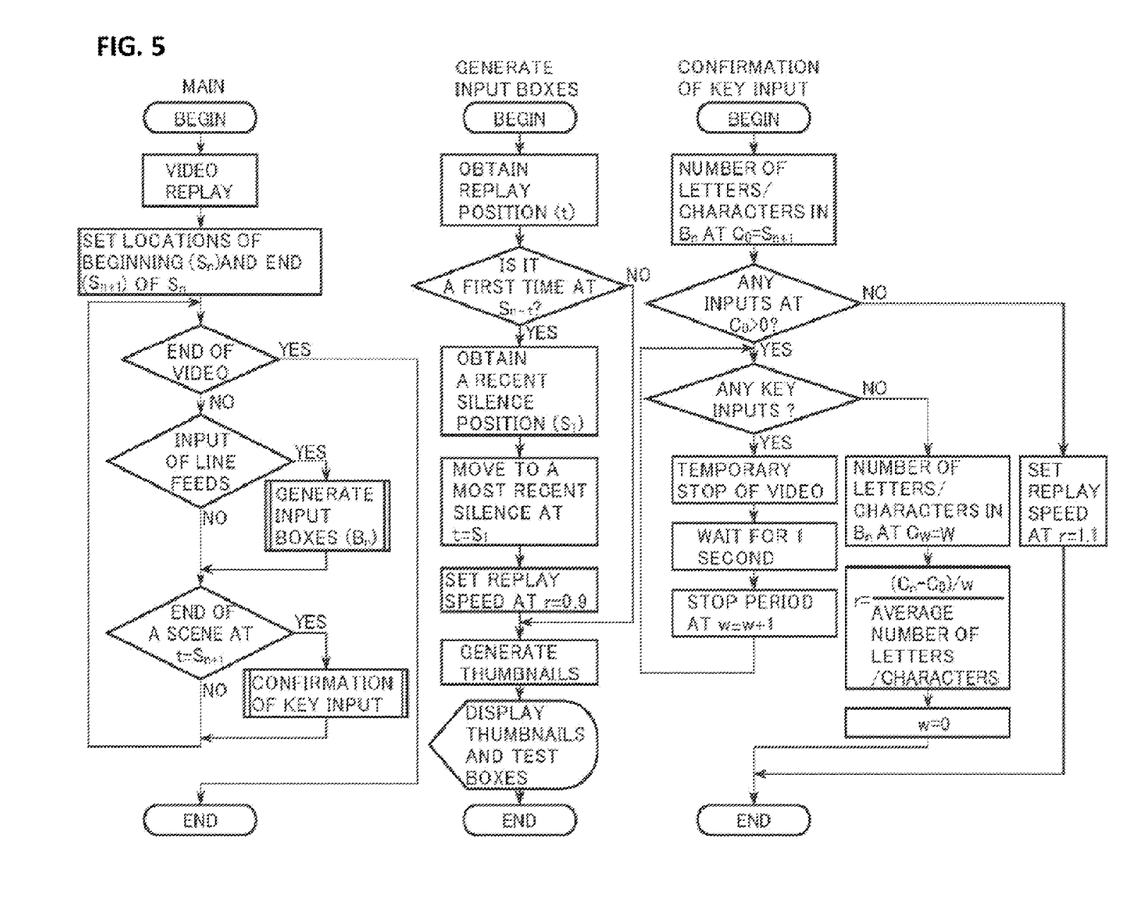
FIG. 5 is a flowchart illustrating the automatic adjustment of the video replay speed in the video replay system of the present invention operates shown in FIG. 4.

Next, in FIG. 4, the details of automatic adjustment of video replay speed are explained. The flow chart in FIG. 5 shows details of automatic adjustment of video replay speed shown in FIG. 5. As such, embodiments in which the automatic control of video replay speed based on the notes taking speed of each viewer are shown in FIGS. 4 and 5.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-339466, filed on Dec. 28, 2007. The entire disclosure of Japanese Patent Application No. 2007-339466 including specification, claims, drawings and summary is incorporated herein by reference in its entirety.

What is claimed is:

1. A video replay system for replaying video data on a computer that has output means including a display and input means, the system comprising:
    (a) storage means configured to store the video data;
    (b) video replay means configured to replay the video data by reading the stored video data out of the storage means and displaying the video data on the display;
    (c) detection means configured to monitor the input means for a predetermined viewing manner of a viewer of the replayed video data while the video data is being replayed, and to detect a viewer input rate parameter associated with a rate at which viewer input is received by the input means for the predetermined viewing manner of the viewer while the video data is being replayed and viewed by the viewer; and
    (d) automatic controlling means configured to automatically control, based upon a comparison between the viewer input rate parameter detected by the detection means and a predetermined reference threshold input rate of the predetermined viewing manner of a viewer of the replayed video data, a speed at which the video data is replayed by the video replay means independently of previous input from the viewer into the video replay system.

2. The video replay system of claim 1, wherein the viewer input includes notes taken by the viewer using the input means.

3. A method for controlling a video replay system for replaying video data on a computer that has output means including a display and input means, the method comprising the steps of:
    (a) replaying video data by reading video data stored in storage means and displaying the video data on the display;
    (b) monitoring the input means for a predetermined viewing manner of a viewer of the replayed video data while the video data is being replayed, and detecting a viewer input rate parameter associated with a rate at which viewer input it received by the input means for the predetermined viewing manner of the viewer while the video data is being replayed and viewed by the viewer; and
    (c) in response to the detected viewer input rate parameter, automatically controlling, based upon a comparison between the viewer input rate parameter detected by the detection means and a predetermined reference threshold input rate for the predetermined viewing manner of a viewer of the replayed video data, a speed at which the video data is replayed independently of previous input from the viewer into the video replay system.

4. The method of claim 3, wherein the viewer input includes notes taken by the viewer using the input means.

5. A non-transitory computer readable storage medium on which a computer program that causes a computer to execute steps included in a method stored in a memory, including:
  (a) replaying video data on a video replay system by reading video data stored in a storage means and displaying the video data on a display;
  (b) monitoring an input means for a predetermined viewing manner of a viewer of the replayed video data while the video data is being replayed, and detecting a viewer input rate parameter associated with a rate at which viewer input it received by the input means for the predetermined viewing manner of the viewer while the video data is being replayed and viewed by the viewer; and
  (c) in response to the detected viewer input rate parameter, automatically controlling, based upon a comparison between the viewer input rate parameter detected by the detection means and a predetermined reference threshold input rate for the predetermined viewing manner of a viewer of the replayed video data, a speed at which the video data is replayed independently of previous input from the viewer into the video replay system.

6. The video replay system in claim 1, wherein the input means includes a keyboard and a touch panel.

7. The method recited of claim 3, wherein the input means includes a keyboard and a touch panel.

8. The computer readable storage medium of claim 5, wherein the viewer input parameter is a rate at which the viewer takes notes by using the input means.

9. The video replay system of claim 1, wherein the video replay means is configured to display, based on the detected viewer input rate parameter, a still image of the video data at a point during replay of the video data that the viewer input rate parameter is detected by the detection means.

10. The video replay system of claim 9, wherein replay of the video data continues when the still image of the video data is displayed.

11. The method of claim 3, further comprising displaying, based on the detected viewer input rate parameter, a still image of the video data at a point during replay of the video data that the viewer input parameter is detected.

12. The video replay system of claim 11, wherein replay of the video data continues when the still image of the video data is displayed.

13. The computer readable storage medium of claim 5, further comprising displaying, based on the detected viewer input rate parameter, a still image of the video data at a point during replay of the video data that the viewer input rate parameter is detected.

14. The computer readable storage medium of claim 13, wherein replay of the video data continues when the still image of the video data is displayed.

15. The video replay system of claim 1, wherein the speed at which the video data is replayed by the video replay means decreases when the viewer input rate parameter is less than the predetermined reference threshold input rate for the predetermined viewing manner of a viewer of the replayed video data.

16. The method of claim 3, wherein the speed at which the video data is replayed by the video replay means decreases when the viewer input rate parameter is less than the predetermined reference threshold input rate for the predetermined viewing manner of a viewer of the replayed video data.

17. The computer readable storage medium of claim 5, wherein the speed at which the video data is replayed by the video replay means decreases when the viewer input rate parameter is less than the predetermined reference threshold input rate for the predetermined viewing manner of a viewer of the replayed video data.

18. The video replay system of claim 1, wherein the speed at which the video data is replayed by the video replay means increases when the viewer input rate parameter is greater than or equal to the predetermined reference threshold input rate for the predetermined viewing manner of a viewer of the replayed video data.

19. The method of claim 3, wherein the speed at which the video data is replayed by the video replay means increases when the viewer input rate parameter is greater than or equal to the predetermined reference threshold input rate for the predetermined viewing manner of a viewer of the replayed video data.

20. The computer readable storage medium of claim 5, wherein the speed at which the video data is replayed by the video replay means increases when the viewer input rate parameter is greater than or equal to the predetermined reference threshold input rate for the predetermined viewing manner of a viewer of the replayed video data.

* * * * *